Aug. 17, 1943.  W. C. GEER  2,327,034
APPARATUS FOR PREVENTING THE ACCUMULATION OF ICE
Filed Sept. 20, 1941
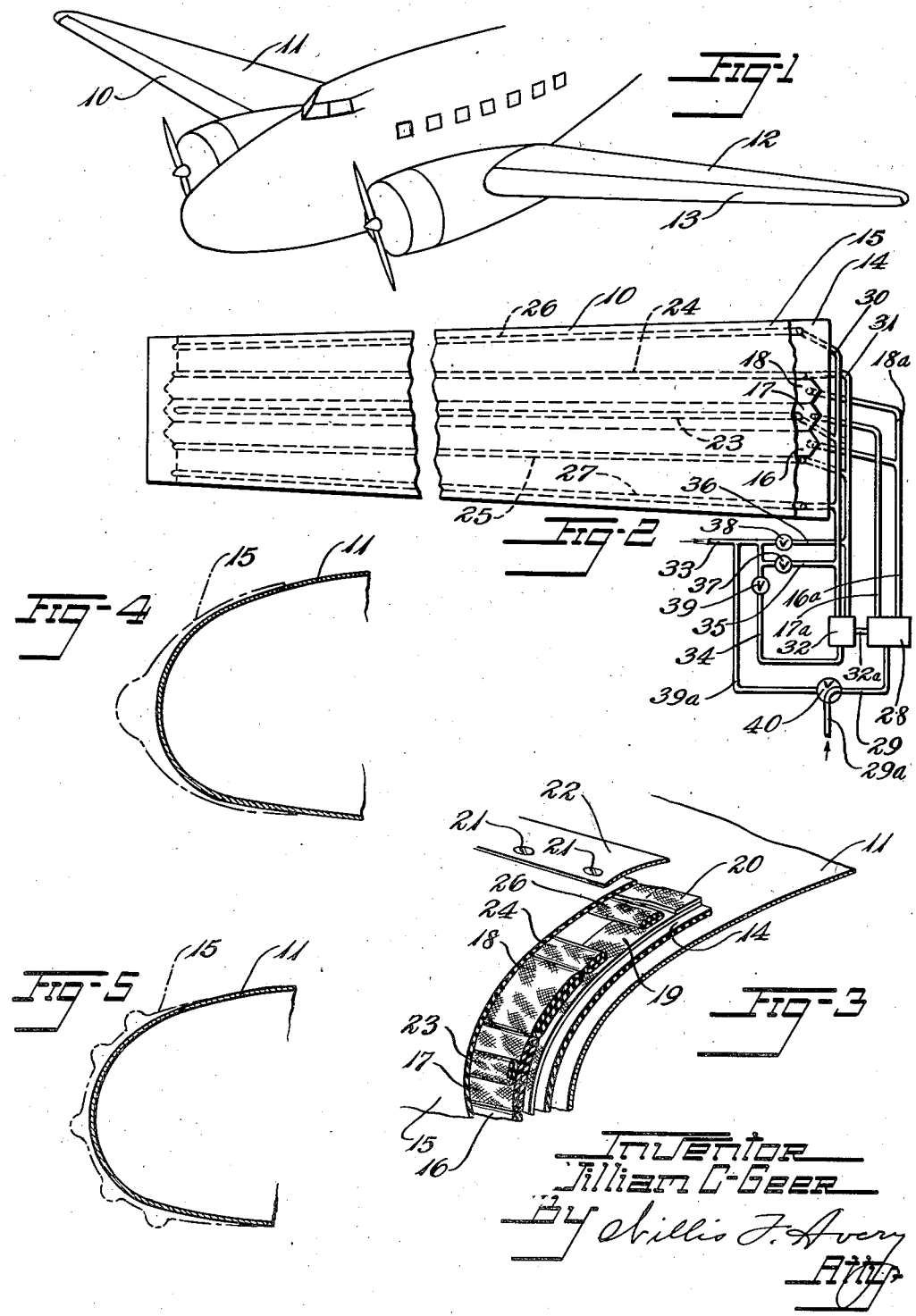

Patented Aug. 17, 1943

2,327,034

UNITED STATES PATENT OFFICE 2,327,034

APPARATUS FOR PREVENTING THE ACCUMULATION OF ICE

William C. Geer, Ithaca, N. Y.

Application September 20, 1941, Serial No. 411,739

9 Claims. (Cl. 244—134)

This invention relates to apparatus for preventing the accumulation of ice upon wings and other airfoils and upon struts and other parts of aircraft and other structures used in icing conditions.

One of the most severe types of ice, which sometimes forms with great rapidity, is that of the clear strong type known as glaze ice. This type of ice possesses considerable tensile strength and has a tendency to accumulate in the form of a cap locked over the leading edge surface of the structure.

In my Patent No. 1,998,809 I have disclosed inflatable apparatus for effecting distortion of exposed surfaces to loosen and break up ice deposits. Such apparatus has been successfully used heretofore to prevent excessive accumulations of ice most frequently encountered in service, and it has been found that good results may be obtained for most types of ice by the use of an inflation pressure of about six to eight pounds per square inch. However, it has been found that such air pressure is not always effective to break up a strong cap of glaze ice rapidly formed. The problem would not be satisfactorily solved simply by increasing the air pressure ordinarily used in continuous operation heretofore where heavier and bulkier apparatus is required for the higher pressure in the capacity needed for continuous operation, especially as such higher pressure is needed only under the relatively infrequent conditions of heavy glaze ice.

A chief object of the invention is to provide apparatus effective to remove heavy deposits of glaze ice, as well as other types of ice, with a minimum of weight and size of apparatus. A further object is to provide for dual operation of the inflation apparatus, so that a relatively low pressure may be used for operating under the less severe icing conditions, and a relatively high pressure is available for the more severe conditions under which heavy glaze ice is formed. A further more specific object is to provide auxiliary inflating means, adapted especially for the removal of heavy glaze ice, in combination with inflating means adapted for other icing conditions more frequently encountered.

These and further objects will be apparent from the following description reference being had to the accompanying drawing in which:

Fig. 1 is a perspective view of an airplane having apparatus mounted upon the leading edges of its wings, which apparatus is constructed in accordance with and embodies the invention.

Fig. 2 is a plan view of the inflatable shoe of the invention as shown in its flattened condition, together with piping connections diagrammatically indicated.

Fig. 3 is a sectional view, as seen in perspective, of the leading edge of the wing with the inflatable shoe of the invention mounted thereon, the parts being broken away and in stepped-back relation for illustration.

Fig. 4 is a diagrammatic section of the leading edge of the wing showing in broken lines an outline of the inflatable shoe extended in one of its positions of low pressure operation.

Fig. 5 is a view like Fig. 4 but showing the outline of the inflatable shoe for high pressure operation to break up heavy glaze ice.

In accordance with the invention I provide inflatable apparatus adapted to be mounted at the leading edge of the aircraft element or other structure together with means for effecting inflation of the same under relatively low air pressure for preventing excessive accumulation of ice under the majority of ice conditions, and in combination with such apparatus I provide auxiliary means for effecting inflation under a considerably higher pressure for occasions when more severe ice caps of glaze ice are formed.

In the preferred form of the invention I provide for inflating a shoe to different shapes and under different pressures for the two conditions of operation, this being effected preferably by a plurality of independently inflatable tubes beneath the distortable surface of the shoe, one or more tubes of relatively small diameter being provided for the higher pressure and a group of larger tubes being provided for the lower pressure operation. Suitable piping, valves and distributor at lower pressure mechanism may be provided for effecting timed mechanical operation or operation under manual control.

With reference to the embodiment illustrated in the drawing, an inflatable shoe 10 is adapted to be mounted upon the leading edge of a wing 11 of the aircraft. The other wing 12 may be similarly provided with a shoe 13, and other airfoils, stabilizers, and struts, and other elements of the aircraft may be similarly provided, as desired.

The inflatable shoe 10 is preferably formed of resilient rubber or other rubber-like material suitably reinforced, as by stretchable fabric, in a manner to permit the desired distortion of the outer surface of the shoe and at the same time to resist tearing of the shoe. The shoe may comprise a bottom supporting layer 14 and an outer stretchable surface layer 15, between which are sandwiched a plurality of inflatable tubes for low pressure operation. Three such tubes are provided in the illustrated embodiment at 16, 17 and 18. Strips 19 of stretchable fabric may be provided across the tubes and in spaced-apart disposition along the shoe, as disclosed more fully in M. L. Taylor Patent #2,168,008. A reinforcing strip 20 at the margin of the shoe facilitates attachment of the shoe in a condition of fore and aft stretch by means of attaching elements 21 extending through a marginal fairing strip 22 and through the shoe and into the skin of the wing 11.

Beneath the cover 15 and overlying the central tube 17 is disposed an inflatable tube 23 preferably of smaller cross section than the tube 17, which tube 23 is provided for high pressure operation and owing to its smaller section will effect distortion of the cover 15 in a sharper curvature than that produced by the larger tube so as to apply a more localized rupturing force to a cap of glaze ice upon the cover. While the smaller tube 23 is shown as overlying the larger tube 17, such smaller tube may if desired be mounted under the larger tube, as an optional arrangement.

Other of the smaller tubes for high pressure operation may be included at desired positions in the structure. In the illustrated embodiment such additional tubes 24, and 25 are provided immediately at the rear of the group of low pressure tubes 16, 17 and 18 and also such additional tubes 26 and 27 are provided near the lower and upper rear margins of the shoe immediately forward of the attaching zones of the shoe. It will be understood that the number and location of such high pressure tubes may be varied in accordance with the severity of the icing conditions to be provided for, it being ordinarily necessary only to rupture the ice cap at one or more places to permit the same to be broken up and dislodged in the flow of air over the surface. Experience has shown that when a cap of glaze ice is broken it separates in large pieces, whereupon it is easily removed, the principal requirement being to exert a sufficient force, preferably locally applied to effect breakage of such ice cap.

In Fig. 4 is illustrated diagrammatically the outline of the cover 15 when only the central low pressure tube 17 is inflated. The cover 15 takes a somewhat different form upon inflation of the other two low pressure tubes 16 and 18, while the central tube 17 is collapsed, and the pair of tubes 16 and 18 are preferably inflated in alternation with the central tube 17 to effect change of shape as well as distortion of the cover for low pressure operation under the icing conditions usually encountered.

In Fig. 5 is illustrated the outline of the cover 15 under high pressure inflation of the small tubes 23 to 27 while the low pressure tubes remain uninflated. It is to be noted that the high pressure inflation of Fig. 5 effects distortion of the cover more locally and at sharper curvature. This action, together with the greater force of the high pressure inflation serves effectively to break up a heavy cap of glazed ice. The smaller diameter of the high pressure tubes reduces the volume of needed air under such high pressure, and there is the further advantage that for a given wall thickness of the material used, the smaller tube can withstand higher unit pressure, the total bursting pressure being in proportion to the diameter.

For the inflation of the low pressure tubes an air pressure of about 6 to 8 pounds per square inch has been found to be satisfactory. For the inflation of the high pressure tubes it is desirable to provide a considerably higher pressure, preferably some two times or more greater.

For inflation of the low pressure tube 17, a suitable pipe 17a may be provided in connection with a motor driven distributor mechanism 28 which may be supplied with the low pressure air through a connection 29, 29a from a suitable source such as a pump or an accumulator (not shown). Piping 16a, 18a connects the low pressure tubes 16 and 18 with the distributor 28 for inflation of the tubes 16 and 18 in alternation with the central tube 17. It will be understood that the number of inflatable tubes and the piping arrangement may be varied as desired.

The high pressure tubes 23 to 27 may be supplied through pipes 30, 31 connected through a distributor 32 with a supply line 33 of the high pressure air by means of a line 34 connecting the distributor to the supply line. Inasmuch as severe glaze ice is encountered infrequently the supply of air to the high pressure tubes may be manually controlled, if desired, and for this purpose the high pressure supply line may be connected directly to the pipes 30, 31 by pipes 35, 36 controlled by valves 37, 38. A valve 39 in the line 34 permits shutting off the high pressure air to the distributor 32.

The distributor 28 may, for example, be of the kind disclosed in M. L. Taylor Patent No. 2,251,430, and the distributor 32 may be of a similar kind and may be driven by a shaft connection 32a from distributor 28 for timed operation with the latter.

In some cases it may be desired to introduce high pressure air into the larger tubes 16, 17 and 18, and for this purpose a connection 39a is provided between the high pressure supply line 39 and the pipe 29 leading to distributor 28. A valve 40 may be provided to open and shut off the high pressure connection 39a, and the low pressure connection 29a alternatively, and preferably to close both these connections when desired.

By the construction herein disclosed a variety of inflating conditions may be effected, changeable with respect to inflation pressure and thereby ice-breaking force, and also with respect to the sharpness of curvature of the cover surface, and the distortion may be effected locally in the cover and also in an extensive manner throughout the same, thus providing for preventing objectionable accumulations of ice under virtually all icing conditions that may be encountered.

Variations may be made without departing from the scope of the invention as it is hereinafter claimed.

I claim:

1. Apparatus for preventing the accumulation of ice, said apparatus comprising a plurality of inflatable elements providing distensible surface portions, means for inflating at least one of said elements and means for inflating another of said elements at a unit pressure different than the inflating pressure for the other element.

2. Apparatus for preventing the accumulation of ice, said apparatus comprising an inflatable element, means for inflating the same, a second inflatable element, and means for inflating the second element at a unit pressure different than the inflating pressure for the first said element.

3. Apparatus for preventing the accumulation of ice, said apparatus comprising distortable surface means, a plurality of inflatable elements for effecting distortion of said surface means, means for inflating at least one of said elements, and means for inflating another of said elements at a unit pressure different than the inflating pressure for the other element.

4. Apparatus for preventing the accumulation of ice, said apparatus comprising extensible surface means, an inflatable element beneath the same for effecting distortion thereof, a second inflatable element also beneath said surface means and in superimposed relation with the first said inflatable element, and means for inflating each of said elements independently.

5. Apparatus as defined in claim 4 in which one of the inflatable elements is of less extent of surface area than the other inflatable element.

6. Apparatus for preventing the accumulation of ice, said apparatus comprising a shoe adapted to be mounted at the leading edge of an aircraft element, said shoe comprising a base layer of rubber-like material, a cover layer of stretchable rubber-like material and a plurality of inflatable tubes between said layers and secured thereto by vulcanization, means for inflating a group of said tubes in alternation one with another relatively low inflating pressure, and means for inflating another of said tubes at a pressure higher than the inflating pressure of said group.

7. Apparatus as defined in claim 6 in which the tube inflated at the higher pressure is of smaller diameter than a tube of said group.

8. Apparatus as defined in claim 6 in which the tube inflated at the higher pressure is smaller in diameter than a tube of said group and is disposed to one side of said group.

9. Apparatus as defined in claim 6 in which the tube inflated at the higher pressure is smaller in diameter than a tube of said group and is mounted in superimposed relation therewith.

WILLIAM C. GEER.